Aug. 15, 1961   J. A. ORSINO   2,996,561
APPARATUS FOR MANUFACTURE OF BATTERY PLATES
Filed May 13, 1958
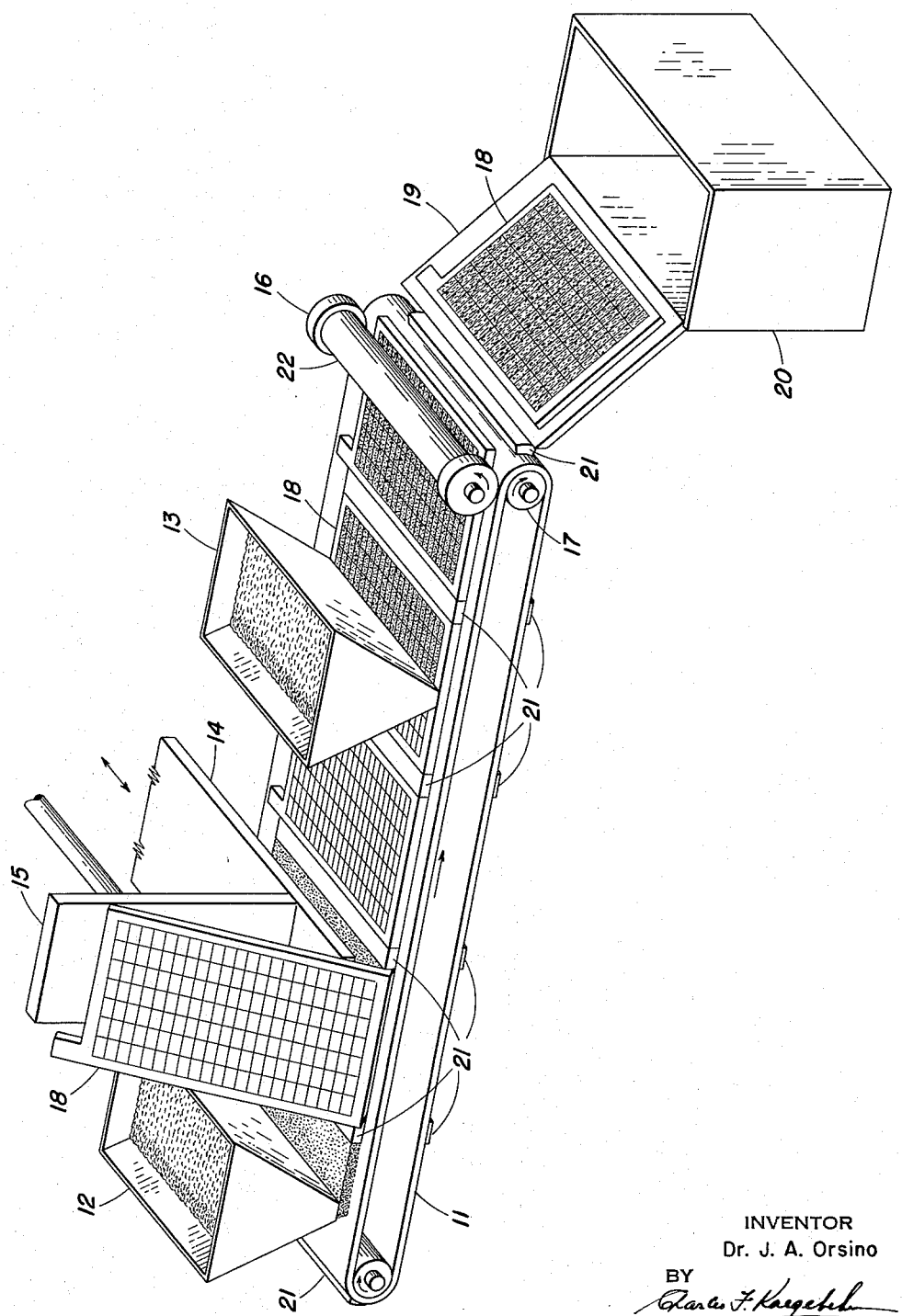
INVENTOR
Dr. J. A. Orsino
BY
ATTORNEY United States Patent Office 2,996,561
Patented Aug. 15, 1961

2,996,561
APPARATUS FOR MANUFACTURE OF BATTERY PLATES
Joseph A. Orsino, Mountain Lakes, N.J., assignor to National Lead Company, New York, N.Y., a corporation of New Jersey
Filed May 13, 1958, Ser. No. 735,044
4 Claims. (Cl. 136—1)

This invention relates to the manufacture of plate-type electrode elements for electrical cells, particularly lead-acid storage batteries and the like. In particular, this invention relates to an apparatus for the manufacture of electrode elements of the type comprising a pasted plate or the like, substantially completely enveloped by a sheath of pervious material functioning as a separator.

Numerous varieties of enveloped electrode elements have been proposed for use in electrical cells. Among these have been electrode surrounded by sheaths of glass fiber in addition to the porous separator material, electrodes in alkaline cells which were enveloped in folded cellophane or the like, lead-acid storage battery plates encased in box-like envelopes of microporous vinyl resin composition, etc. In general, these enveloped electrodes were sheathed in prefabricated materials, in the sense that the sheathing material was in film or sheet form to begin with, and its application to the electrode was a question of mechanical assembly, using methods adapted to the handling of such materials.

Copending applications Serial Nos. 714,569, filed Feb. 11, 1958, now abandoned, 723,958, filed March 26, 1958, now abandoned, and 724,710, filed March 28, 1958, now abandoned, all assigned to the assignee hereof, describe and claim respectively a modified cellulosic material having associated therewith a hydrocarbon polymer bound to the surface of the cellulosic fibers, fabricated articles, including battery separators, made from such a material, and a battery electrode element comprising a pasted supporting structure enveloped in a sheath of pervious material formed by cementing together the hydrocarbon polymer sheaths on the fibers of such a material. Also described and claimed in said application Serial No. 724,710, now abandoned, is a method for forming such a sheath around the electrode element, by surrounding the electrode with a modified cellulosic material and cementing adjacent fibers in place, preferably by heating and recooling, thereby forming a coherent envelope around the electrode.

As indicated above, previous methods for making sheathed electrodes made use of starting materials in sheet form, and consequently were not adapted to the manufacture of sheathed electrodes using loose, bulk material. Moreover, the apparatus heretofore employed for assembly of such structures was also unsuitable for the manufacture of sheathed plates starting with a sheathing material in bulk form.

An object of this invention therefore is to provide improved apparatus for the manufacture of enveloped electrodes for electrical cells. Another object is to provide apparatus for such manufacture, which is adapted to use bulk-form starting materials as the sheathing substance. Other objects and advantages will become apparent from the following more complete description and claims.

Broadly, this invention contemplates apparatus adapted for the manufacture of a sheathed electrode structure, said apparatus comprising in combination a generally horizontal supporting member, dispensing means operative to deposit on said supporting member a plurality of successive superposed layers of heat-sealable bulk material, electrode-depositing means operative to deposit an electrode on one of said layers prior to the deposition of the next successive layer, heat-sealing means operative to convert said layers of material to a coherent mass enveloping said electrode, and means for creating generally horizontal relative motion between said supporting member and said dispensing means, said electrode-depositing means, and said heat-sealing means.

To illustrate a suitable sheathing material according to this invention, twenty-four grams of wood cellulose floc were dispersed in 1400 cc. of toluene under dry conditions. The air in the vessel was replaced with nitrogen and 0.0316 mol of $TiCl_4$ was added to the dispersion. The mixture was allowed to react for one-half hour at room temperature to bring about the titanation of the cellulose, after which 0.075 mol of methylmagnesium bromide was added. The temperature was raised to and maintained at 50–60° C., while a stream of gaseous ethylene was passed through the mixture. The color changed from orange through dark green to almost black. The flow of ethylene was continued for six hours, until the rate of absorption became negligible. The amount of ethylene absorbed was approximately equal to the amount of cellulose floc in the reaction vessel.

This product may be fabricated into a storage battery separator by laying it down in the form of a web and lightly compressing it at a temperature of approximately 150° C.

Referring now to the figure, FIG. 1 is a perspective view of one preferred embodiment of the apparatus according to this invention.

In FIG. 1, the generally horizontal supporting member is shown as belt 11. Hoppers 12 and 13 constitute the dispensing means. The electrode depositing means in this embodiment is represented by a reciprocating platform 14 in association with a plunger 15. The heating means in this embodiment of the invention is provided by heated rolls 16 and 17. The means for creating generally horizontal relative motion is the belt and its associated rollers, actuated by suitable drive means, not shown.

In the operation of the invention as shown in FIG. 1, a layer of heat sealable bulk material is deposited on the surface of the belt as the latter passes beneath hopper 12. A pasted plate 18 is carried forward on reciprocating platform 14, which then recedes, dropping the plate on the bed of bulk material. The plate is restrained from being carried back with platform 14 by the action of plunger 15 which moves forward with platform 14 behind the plate, and remains stationary until the platform has receded sufficiently to deposit the plate on the bed of bulk material, and then returns to repeat the cycle for the next plate.

As the belt continues along its path, carrying the initial layer of bulk material and the plate thereon, it then passes beneath hopper 13, where an additional layer of bulk material is deposited on it, covering the plate. The "sandwich," consisting of the plate between two layers of bulk material, then passes between heated rolls 16 and 17, causing the bulk material to be heat-sealed to a coherent, porous mass substantially completely enveloping the plate. The finished assembly is then transported by suitable means to a suitable collector, as down chute 19 to bin 20.

Preferably, the belt is also provided with ridges as shown at 21, which serve to interrupt the continuity of the deposited layers of bulk material, thus facilitating the separation of the individual sheathed electrode elements. Preferably also, at least one of the heating rolls is channelled, as indicated at 22. A roll of this configuration surrounds the plate at its edges, and facilitates the production of a good seal.

Obviously, many variations are possible within the scope of this invention. Thus, instead of providing two hoppers, as hoppers 12 and 13 in FIG. 1, one may equally well employ as the dispensing means a single large hopper having two discharge points, one before and one after the portion of the belt where the plates are deposited. Similarly, instead of moving continuously, the belt may be given a reciprocating motion so that it passes under the same hopper twice for each plate deposited thereon. Many equivalents of the arrangement shown may be used for the purpose of depositing the plate on the support member, and many other heating arrangements, for example infra-red lamps, high-frequency electro-magnetic fields, direct flames, etc., can be used in place of the heated rolls. Moreover, it is not essential, although it is ordinarily desirable, that the horizontal support member serve also as the means for creating relative horizontal motion, as in the case of the belt shown in FIG. 1. The same result can readily be achieved by making the support member stationary and arranging the hoppers, plate-depositing means, and heating means to be the movable elements. Other modifications and variations will be readily evident to those skilled in the art, without departing from the spirit of the invention as defined in the annexed claims.

I claim:

1. Apparatus adapted for the manufacture of a sheathed storage battery plate, said apparatus comprising in combination a conveyor belt, a first dispensing means for depositing on said belt a first layer of heat-sealable bulk material, electrode-depositing means for depositing an electrode on said belt over said first layer, a second dispensing means for depositing a second layer of heat-sealable bulk material on said belt over said first layer and said electrode, and heat-sealing means for converting said two layers of material to a coherent mass enveloping said electrode, said first dispensing means, said electrode-depositing means and said second dispensing means being mounted above said belt and spaced along said belt, in the direction of travel thereof, in the order named, said heat-sealing means being disposed above and below the plane of said belt, and spaced from said second dispensing means in the direction of travel of said belt.

2. Apparatus according to claim 1, wherein said belt is provided with raised members in the form of transverse ribs, said ribs being of a height approximating the combined thickness of said first layer of heat-sealable material, said electrode and said second layer of heat-sealable material, said ribs constituting means for breaking the continuity of said layers of bulk material.

3. Apparatus for the manufacture of a sheathed storage battery plate, said apparatus comprising in combination a generally horizontal supporting member, a first dispensing means for depositing on said supporting member a first layer of heat-sealable bulk material, electrode-depositing means for depositing an electrode on said supporting member over said first layer, a second dispensing means for depositing a second layer of heat-sealable bulk material on said supporting member over said first layer and said electrode, and heat-sealing means comprising a pair of coacting heated rolls for converting said two layers of material to a coherent mass enveloping said electrode, said first dispensing means, said electrode-depositing means and said second dispensing means being mounted above said belt and spaced along said belt, in the direction of travel thereof, in the order named, said heat-sealing means being disposed above and below the plane of said belt, and spaced from said second dispensing means in the direction of travel of said belt.

4. Apparatus according to claim 3, wherein at least one of said rolls is provided with end sections of a first radius and a working section intermediate said ends, said working section having a smaller radius than said first radius, said rolls being thereby held apart in the vicinity of said working section and defining a channel between said rolls, said channel being of a depth to accommodate the thickness of a sheathed electrode passing between said rolls.

References Cited in the file of this patent

UNITED STATES PATENTS

| 842,356 | Stone | Jan. 29, 1907 |
| 1,367,227 | Baumgartl | Feb. 1, 1921 |
| 1,645,424 | Hazelett | Oct. 11, 1927 |
| 2,804,672 | Altschuler | Sept. 3, 1957 |
| 2,835,016 | Dixon | May 20, 1958 |
| 2,870,235 | Soltis | Jan. 20, 1959 |

FOREIGN PATENTS

| 923,935 | France | July 22, 1947 |